United States Patent
Cho

(10) Patent No.: US 9,423,656 B2
(45) Date of Patent: Aug. 23, 2016

(54) LIQUID CRYSTAL DISPLAY AND METHOD FOR FABRICATING THE SAME

(71) Applicant: Sung Ho Cho, Yongin (KR)

(72) Inventor: Sung Ho Cho, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 91 days.

(21) Appl. No.: 13/920,377

(22) Filed: Jun. 18, 2013

(65) Prior Publication Data

US 2014/0118667 A1    May 1, 2014

(30) Foreign Application Priority Data

Oct. 26, 2012    (KR) ........................ 10-2012-0119848

(51) Int. Cl.
| | |
|---|---|
| G02F 1/1343 | (2006.01) |
| G02F 1/1335 | (2006.01) |
| G02F 1/1333 | (2006.01) |
| G02F 1/1339 | (2006.01) |

(52) U.S. Cl.
CPC ... *G02F 1/134309* (2013.01); *G02F 1/133512* (2013.01); *G02F 2001/13398* (2013.01); *G02F 2001/133337* (2013.01); *G02F 2001/134318* (2013.01)

(58) Field of Classification Search
CPC .......... G02F 1/1343; G02F 1/134309; G02F 1/133512; G02F 1/136227; G02F 1/136209; G02F 1/133345; G02F 1/133348; G02F 1/136286; G02F 1/133707; G02F 1/134336; G02F 1/13452; G02F 1/1339; G02F 1/1341; G02F 1/13392; G02F 1/19934

USPC ........ 349/141, 139, 43, 106, 138, 156, 143, 349/155, 46, 144, 147, 153, 56, 190, 152, 349/40

See application file for complete search history.

(56) References Cited

U.S. PATENT DOCUMENTS

| | | |
|---|---|---|
| 6,580,487 B1 | 6/2003 | Kim et al. |
| 6,642,985 B2 | 11/2003 | Kim et al. |
| 7,830,464 B2 * | 11/2010 | Song et al. ..................... 349/43 |
| 2004/0174484 A1 * | 9/2004 | Matsumoto ................. 349/139 |
| 2004/0189921 A1 * | 9/2004 | Chen et al. .................. 349/141 |

(Continued)

FOREIGN PATENT DOCUMENTS

| | | | |
|---|---|---|---|
| JP | 2008096474 A | * | 4/2008 |
| KR | 10-2004-0050623 A | | 6/2004 |

(Continued)

OTHER PUBLICATIONS

English translation of JP 2008-096474, Title: Liquid Crystal Display, Author: Kaneko Hideki, Higa Masakatsu; Date of publication: Apr. 24, 2008.*

*Primary Examiner* — Dung Nguyen
*Assistant Examiner* — Shan Liu
(74) *Attorney, Agent, or Firm* — Lee & Morse, P.C.

(57) ABSTRACT

A liquid crystal display includes a first display panel having a light-transmitting region and a light-shielding portion, a second display panel that faces the first display panel with liquid crystals interposed between the first and second display panels and that includes a TFT substrate, a pixel electrode on the TFT substrate, a passivation film on the TFT substrate and the pixel electrode, and a common electrode patterned on the passivation film, and a trench in the passivation film within the light-shielding region between the first and second display panels. The trench encloses the light-transmitting region, and the common electrode is on the trench.

10 Claims, 9 Drawing Sheets

(56) References Cited

U.S. PATENT DOCUMENTS

| | | | |
|---|---|---|---|
| 2009/0091675 A1* | 4/2009 | Park et al. | 349/43 |
| 2009/0237342 A1* | 9/2009 | Maede | G02F 1/134363 345/92 |
| 2009/0322975 A1* | 12/2009 | Song | G02F 1/133707 349/46 |
| 2010/0165278 A1* | 7/2010 | Matsumori et al. | 349/123 |
| 2012/0242944 A1* | 9/2012 | Tsuchiya | 349/153 |

FOREIGN PATENT DOCUMENTS

| KR | 10-2007-0059385 A | 6/2007 |
|---|---|---|
| KR | 10-2008-0050033 A | 6/2008 |

* cited by examiner

LIQUID CRYSTAL DISPLAY AND METHOD FOR FABRICATING THE SAME

CROSS-REFERENCE TO RELATED APPLICATION

This application claims priority under 35 U.S.C. §119 to Korean Patent Application No. 10-2012-0119848, filed on Oct. 26, 2012, in the Korean Intellectual Property Office, the disclosure of which is incorporated herein by reference in its entirety.

BACKGROUND

A liquid crystal display may be employed in a variety of devices, including TV sets, monitors, notebook computers, mobile phones, PDAs, smart phones, etc.

SUMMARY

Embodiments may be realized by providing a liquid crystal display that includes a first display panel including a light-transmitting region and a light-shielding portion, a second display panel facing the first display panel with liquid crystals interposed between the first and second display panels and including a TFT substrate, a pixel electrode formed on the TFT substrate, a passivation film formed on the TFT substrate and the pixel electrode, and a common electrode patterned on the passivation film, and a trench formed on the passivation film in the light-shielding region between the first and second display panels, the trench disposed to surround the light-transmitting region and the common electrode formed on the trench.

A bottom portion of the trench may face the pixel electrode. The portion of the common electrode on a bottom portion of the trench may have a shorter vertical spacing from the pixel electrode than another portion of the common electrode on the passivation film. The first display panel may include a color filter in the light-transmitting region and a black matrix in the light shielding region, which are positioned on a surface of a first substrate, and an over-coat layer covering the color filter and the black matrix.

Embodiments may also be realized by providing a liquid crystal display including a first display panel including a light-transmitting region and a light-shielding region, a second display panel facing the first display panel with liquid crystals interposed between the first and second display panels and including a TFT substrate, a pixel electrode formed on the TFT substrate, a passivation film formed on the TFT substrate and the pixel electrode, and a common electrode patterned on the passivation film, a trench formed on the passivation film in the light-shielding region between the first and second display panels, the trench disposed to surround the light-transmitting region and the common electrode formed on the trench, and a cell gap maintaining member including a cell gap maintaining member including a conductive material and covering at least a portion of the common electrode contacting a surface of the over-coat layer and formed on the trench.

The cell gap maintaining member may include the conductive material on a surface thereof. The conductive material may be a same material as the common electrode. The conductive material may be an indium tin oxide (ITO). A bottom portion of the trench may be formed at a location corresponding to the pixel electrode. A portion of the common electrode on the bottom portion of the trench may have a shorter vertical spacing from the pixel electrode than another portion of the common electrode on the passivation film.

Embodiments may also be realized by providing a liquid crystal display including a first display panel including a light-transmitting region and a light-shielding region, and a second display panel facing the first display panel with liquid crystals interposed between the first and second display panels and including a TFT substrate, a pixel electrode formed on the TFT substrate, a passivation film and a common electrode, wherein a vertical spacing between the pixel electrode and the common electrode in a portion of the light-shielding region between the first and second display panels is shorter than a vertical spacing between the pixel electrode and the common electrode in the light-transmitting region.

A second substrate may include the TFT substrate, the pixel electrode formed on the TFT substrate, the passivation film on the TFT substrate and the pixel electrode, and the common electrode patterned on the passivation film. The vertical spacing between the pixel electrode and the portion of the common electrode in the light-shielding region may correspond to a vertical distance between a top surface of the pixel electrode and a bottom surface of the portion of the common electrode in the light-shielding region.

A second substrate may include the TFT substrate, the common electrode patterned on the TFT substrate, the passivation film on the TFT substrate and the pixel electrode, and the pixel electrode on the passivation film. The vertical spacing between the pixel electrode and the portion of the common electrode in the light-shielding region may correspond to a vertical distance between a bottom surface of the pixel electrode and a top surface of the portion of the common electrode in the light-shielding region. The passivation film may include a single layer structure or a multi-layered structure.

Embodiments may also be realized by providing a method for fabricating a liquid crystal display, the method including preparing a TFT substrate having a pixel electrode formed thereon, forming a passivation film on the pixel electrode and the TFT substrate, forming a trench by etching a portion of the passivation film facing the pixel electrode, forming a common electrode patterned at locations corresponding to an opening and the trench on the passivation film having the trench formed therein, and forming a second display panel including a first substrate having liquid crystals interposed between the passivation film and the common electrode, a color filter and a black matrix positioned on a surface of the first substrate, and an over-coat layer covering the color filter and the black matrix.

Embodiments may also be realized by providing a method for fabricating a liquid crystal display, the method including preparing a TFT substrate having a pixel electrode formed thereon, forming a passivation film on the TFT substrate, forming a trench by etching a portion of the passivation film facing the pixel electrode, forming a common electrode patterned at locations corresponding to an opening and the trench on the passivation film having the trench formed therein, forming a cell gap maintaining member including a conductive material covering at least a portion of the common electrode having the trench, and forming a first display panel such that the cell gap maintaining member makes contact with the over-coat layer, the first display panel including a first substrate having liquid crystals interposed between the passivation film and the common electrode, a color filter and a black matrix positioned on a surface of the first substrate, and an over-coat layer covering the color filter and the black matrix.

BRIEF DESCRIPTION OF THE DRAWINGS

Features will become apparent to those of ordinary skill in the art by describing in detail exemplary embodiments thereof with reference to the attached drawings in which.

DETAILED DESCRIPTION

Figure 1:
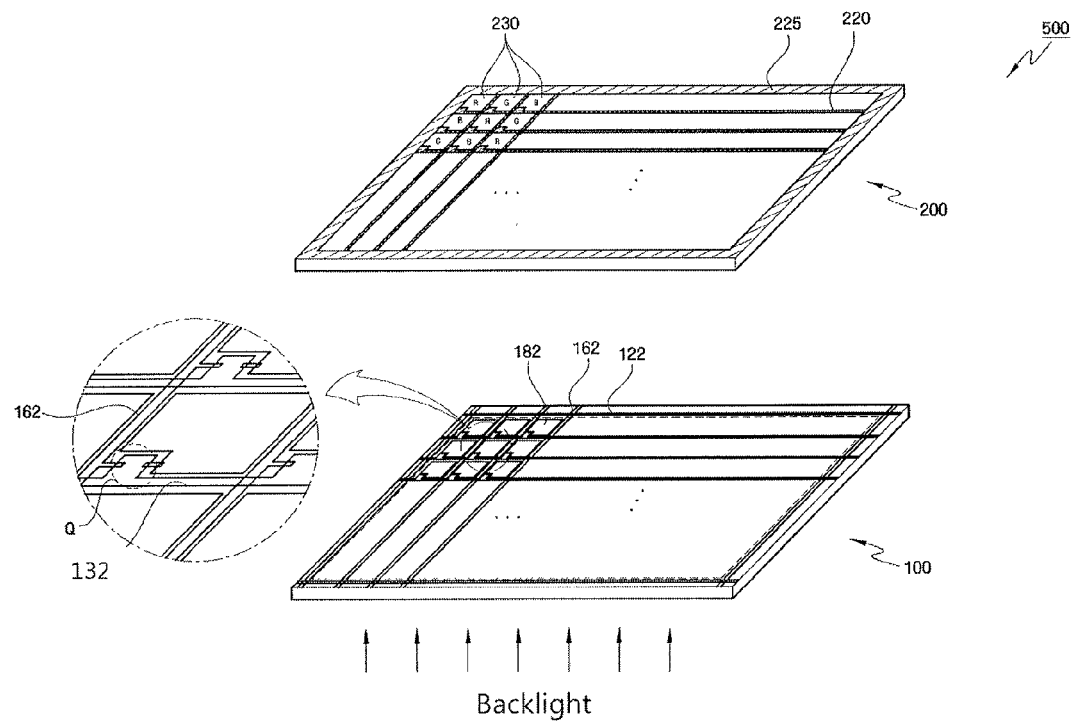
FIG. 1 is an exploded perspective view schematically illustrating a liquid crystal display according to an exemplary embodiment.

The aspects and features of the embodiments and methods for achieving the aspects and features will be apparent by referring to the embodiments to be described in detail with reference to the accompanying drawings. However, embodiments are not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the embodiments.

The term "on" that is used to designate that an element is on another element or located on a different layer or a layer includes both a case where an element is located directly on another element or a layer and a case where an element is located on another element via another layer or still another element. In the entire description, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Hereinafter, a liquid crystal display according to an embodiment will be described with reference to FIGS. 1 and 2.

FIG. 1 is an exploded perspective view schematically illustrating a liquid crystal display according to an embodiment.

As shown in FIG. 1, the liquid crystal display 500 includes a liquid crystal display panel including a first display panel 100, and a second display panel 200 facing the first display panel 100 with liquid crystals interposed between the first display panel 100 and the second display panel 200.

The first display panel 100 includes a plurality of gate lines 132 extending in parallel along a first direction, and a plurality of data lines 162 extending in parallel along a second direction. The first direction intersects and/or is perpendicular to the second direction. The gate lines 132 and the data lines 162 may be made of a conductive material, for example, aluminum (Al), copper (Cu), silver (Ag), molybdenum (Mo), chrome (Cr), titanium (Ti), tantalum (Ta) or combinations thereof, and may be formed of a single layer or multiple layers of two or more layers. The gate lines 132 and the data lines 162 may cross each other. For example, the gate lines 132 and the data lines 162 may intersect in a perpendicular direction with respect to each other. Each of adjacent gate lines 132 intersects each of adjacent data lines 162 to define a pixel. The pixel includes a thin film transistor Q and a pixel electrode 182 switched by the transistor Q.

The second display panel 200 includes a black matrix 220 and color filter patterns 230 formed in a lattice configuration. The black matrix 220 is made of an opaque material and is formed along the periphery of the pixel, for example, along a periphery of the color filter patterns 230. The color filter patterns 230 may have red (R), green (G), and blue (B) color filters arranged in various patterns, for example, alternately arranged. Each of the color filter patterns 230 are surrounded by the black matrix 220. For example, the black matrix 220 may have a width of approximately 30 to 40 μm.

The first display panel 100 and the second display panel 200 are combined with each other and have liquid crystals therebetween. The gate lines 132 and the data lines 162 of the first display panel 100 are aligned to overlap the black matrix 220 of the second display panel 200.

A backlight unit (not shown) is disposed at a side of the first display panel 100. The light emitted from the backlight unit is allowed to pass through the first display panel 100, the liquid crystals (300 of FIG. 4), and the second display panel 200. A region in which the light emitted from the backlight unit is always shielded by one of the first and second display panels 100 and 200, for example, without being affected by a change in the liquid crystal arrangement depending on presence or absence of an electric field in the liquid crystal display panel, is referred to as a "light-shielding region." The light-shielding region corresponds to a sum of sets of a light-shielding region of the first display panel 100, for example, a region where the gate lines 132, the data lines 162, and sustaining electrode lines (not shown), thin film transistors, etc. are formed. A light-shielding region of the second display panel 200 may be, for example, a region where the black matrix 220, etc. are formed. A region other than the light-shielding region, for example, a region through which the light emitted from the backlight unit is transmitted according to presence or absence of an electric field created, is referred to as a "light-transmitting region."

Figure 2:
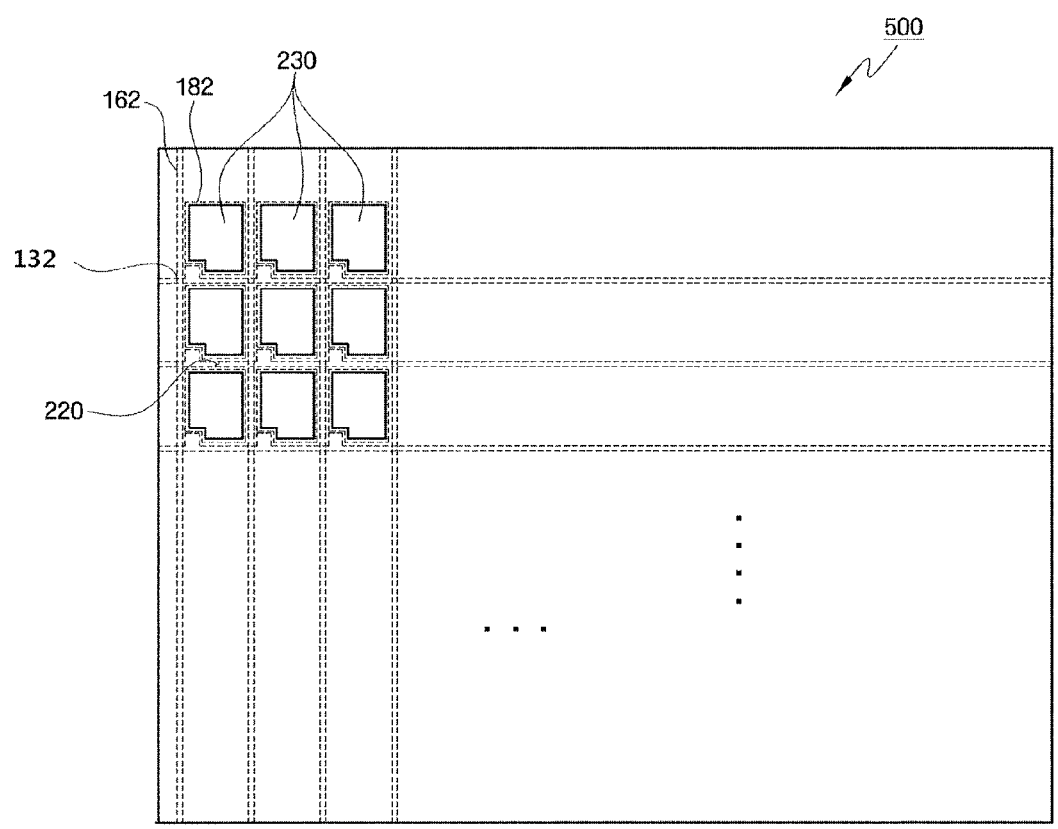
FIG. 2 is a plan view of a display device according to an exemplary embodiment.

FIG. 2 is a plan view of a display device according to an embodiment. In FIG. 2, dotted lines indicate the gate lines 132, the data lines 162 and the pixel electrode 182 formed in the first display panel of the liquid crystal display 500.

As shown in FIG. 2, the light-shielding region corresponds to a sum of sets of a first display panel region where the gate lines 132 and the data lines 162 are formed and a second display panel region where the black matrix 220 is formed. The black matrix 220 of the second display panel is aligned to overlap the gate lines 132 and the data lines 162 of the first display panel to minimize the light-shielding region. A width of the black matrix 220 is larger than widths of the gate lines 132 and the data lines 162 to prevent light leakage and to improve visibility. That is to say, when viewed from a top, the black matrix 220 may be formed to cover the gate lines 132 and the data lines 162.

The light-transmitting region corresponds to an intersection of the pixel electrode 182 of the first display panel and the color filter pattern 230 of the second display panel. The filter pattern 230 may be formed in the pixel electrode 182 while overlapping the pixel electrode 182.

FIGS. 3 to 9 are cross-sectional views of a liquid crystal display according to various embodiments.

Figure 3:
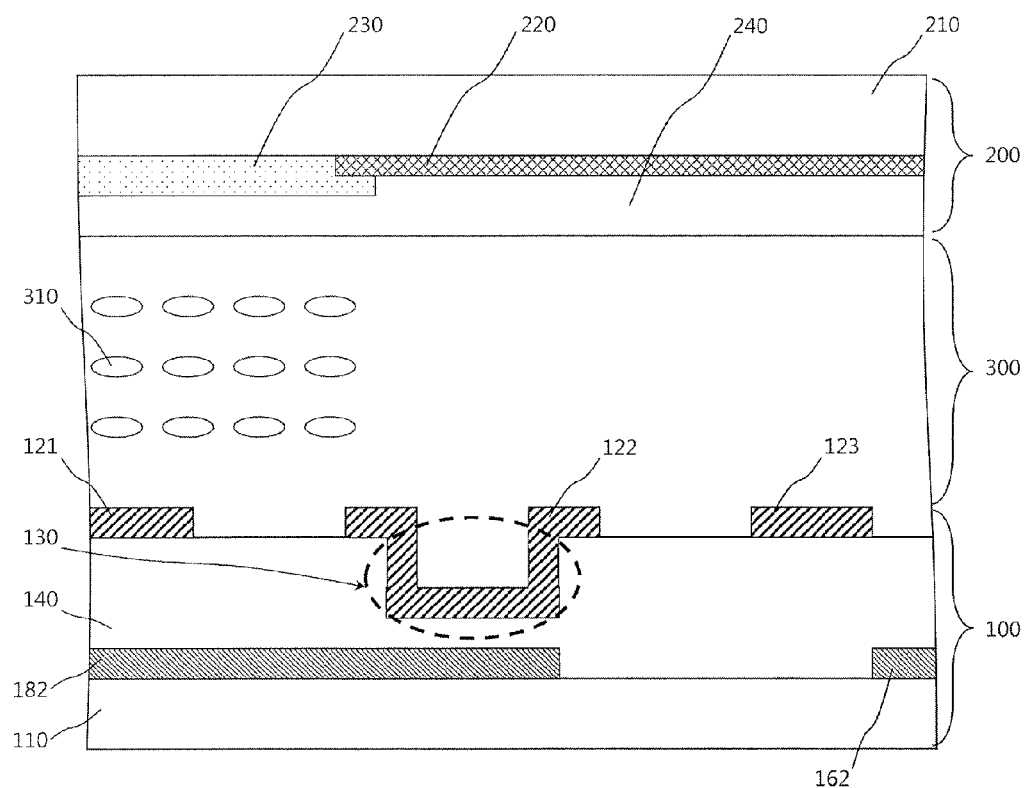
FIGS. 3 to 9 are cross-sectional views of a liquid crystal display according to various exemplary embodiments.

Referring to FIG. 3, the first display panel includes a TFT substrate 110, a pixel electrode 182, a data line 162, a passivation film 140, and common electrodes 121, 122 and 123.

Although not shown, a plurality of gate wires transmitting gate signals may be formed on an insulating substrate in the TFT substrate 110. The configuration of the gate wires include, for example, gate lines extending in a first direction, gate pads connected to ends of the gate lines, the application of gate signals from the outside and transmitting the gate signals to the gate lines, and a gate electrode of a thin film transistor in the form of a protrusion. The gate wires may include, for example, but are not limited to, aluminum (Al), copper (Cu), silver (Ag), molybdenum (Mo), chrome (Cr), titanium (Ti), tantalum (Ta) or combinations thereof, which are deposited on the insulating substrate (by a process such as sputtering) and patterned by photolithography.

The gate wires may be formed of multiple layers of two or more layers according to various exemplary embodiments. For example, the multiple layers forming the gate wires may include a lower film improving adhesion with respect to the insulating substrate and/or functioning as a barrier film, a low-resistance conductive layer and an upper film for preventing materials forming the low-resistance conductive layer from being diffused and functioning as a capping film, etc. Examples thereof may include a triple layered structure of Mo/Al/Mo films. A conductive oxide or nitride may be used as the material for forming the lower or upper film, and a triple layered structure of ITO/Ag/ITO may be used.

Although not shown for brevity and convenience of explanation, sustaining electrode lines for improving charge preserving capability of pixels may further be formed on the same layer as the gate wires of the insulating substrate. The sustaining electrode lines may be made of the same materials as the gate wires and may be deposited and patterned at the same time with the gate wires. Shapes and arrangements of the sustaining electrode lines may be modified in various manners. In a case where an amount of sustain capacity generated due to, for example, overlapping of the pixel electrode 182 and the gate line, is not sufficiently large, the sustaining electrode lines may not be formed.

A gate insulating film covers the entire surface of the insulating substrate having the gate wires formed thereon. The gate insulating film may be made of silicon nitride and may be formed by, for example, sputtering, reactive sputtering, or chemical vapor deposition (CVD).

A semiconductor layer having at least a portion overlapping the gate electrode is formed on the gate insulating film. The semiconductor layer may be made of a semiconductor, such as hydrogenated amorphous silicon. An ohmic contact layer may be formed on the semiconductor layer. The ohmic contact layer may be an n+ hydrogenated amorphous silicon layer heavily doped with n-type impurity. While the ohmic contact layer may cover substantially an entirety of the semiconductor layer, it may be separated into two parts in view of the semiconductor layer to expose a portion of the semiconductor layer.

The semiconductor layer and the ohmic contact layer may be deposited by, for example, CVD, and patterned by photolithography. The semiconductor layer and the ohmic contact layer may be formed in an island shape or a line shape according to the mask process selected. In a case where they are formed in an island shape, they may be patterned before data wires to be described above are formed, except for separating patterns of the ohmic contact layer.

The data wires may be formed over the ohmic contact layer and the gate insulating film. The configuration of the data wires include, for example, data lines that transmit data signals and that extend in a second direction, a source electrode branched from the data line and extending up to an upper portion of the ohmic contact layer, a data pad connected to one end of the data line and applying image signals from the outside, and a drain electrode separated from the source electrode and formed on the ohmic contact layer opposite to the source electrode with a channel portion of the thin film transistor between the ohmic contact layer and the source electrode.

The data line is insulated from and intersects the gate line by the gate insulating film, and a region formed by intersection of adjacent data lines and adjacent gate lines forms a pixel.

The data wire may include, but not limited to, aluminum (Al), copper (Cu), silver (Ag), molybdenum (Mo), chrome (Cr), titanium (Ti), tantalum (Ta) or combinations thereof, which are deposited on the insulating substrate by, for example, sputtering, and patterned by photolithography. The ohmic contact layer as a lower layer and the semiconductor layer as an upper layer may also be patterned using a single photoresist mask as an etch mask according to the mask process selected.

The data wires may be formed of multiple layers of two or more layers according to necessity, which is the same as described above with regard to the gate wires, and repeated explanations thereof will be omitted.

The gate electrode, semiconductor layer formed thereon, the ohmic contact layer, the source electrode and the drain electrode form a thin film transistor.

The passivation film is formed in the TFT substrate on the data wired and the semiconductor layer not covered by the data wires, and covers the substantially entire surface of the insulating substrate. The passivation film provided in the TFT substrate may be made of an inorganic material such as silicon nitride or silicon oxide, or an organic material having good planarizing characteristic and high photosensitivity. In a case where the passivation film provided in the TFT substrate is made of an organic material, an insulating film made of silicon nitride or silicon oxide may further be formed under the passivation film in order to supplement an insulating characteristic. The passivation film provided in the TFT substrate may be formed by, for example, sputtering, CVD, plasma enhanced chemical vapor deposition (PECVD), coating, or the like.

A contact hole exposing the drain electrode and the data pad may be formed in the passivation film provided in the TFT substrate. In addition, a contact hole exposing the gate pad may be formed in the passivation film provided in the TFT substrate and the gate insulating film while penetrating the passivation film provided in the TFT substrate and the gate insulating film.

The pixel electrode 182 is formed on the TFT substrate 110. The pixel electrode 182 may be electrically connected to a drain electrode (not shown) through a contact hole (not shown). The pixel electrode 182 having a data voltage applied thereto creates an electric field together with the common electrodes 121, 122 and 123 disposed on the passivation film 140, thereby changing the arrangement of liquid crystals 310.

Since the passivation film 140 may be the same as described with respect to the passivation film provided in the TFT substrate, repeated explanations thereof will be omitted.

The trench 130 is formed in the passivation film 140 in a light-shielding region formed by the black matrix pattern 220 of the second display panel 200. The trench 130 may be formed by, for example, a photoresist method, dry etching or wet etching. The trench 130 is formed at a location vertically corresponding to the pixel electrode 182. For example, the trench 130 may be in an overlapping relationship with the pixel electrode 182 thereunder and an overlapping relationship with the black matrix pattern 220 thereabove.

One of the common electrodes 121, 122 and 123 may be formed in the trench 130 while being patterned on the passivation film 140. For example, the common electrode 122 formed in the trench 130 may have a shorter vertical spacing in comparison with the common electrode 121 in the light-transmitting region with respect to the pixel electrode 182. Accordingly, a strong electric field may be created, so that impurity ions floating in the liquid crystal layer 300 are collected. That is to say, the impurity ions included in the liquid crystal layer 300 for reducing a voltage holding ratio (VHR) of the liquid crystal display (500 of FIG. 1) and generating residual DC are collected by the common electrode 122 formed in the trench 130, thereby increasing the VHR of the liquid crystal display (500 of FIG. 1) and removing the residual DC, ultimately improving display quality of the liquid crystal display (500 of FIG. 1).

The common electrodes 121, 122 and 123 may be made of a transparent material, such as indium tin oxide (ITO) or zinc tin oxide. The common electrodes 121, 122 and 123 may be formed by, for example, sputtering or reactive sputtering.

Next, the second display panel 200 facing the first display panel 100 will be described.

The black matrix 220 substantially defining a pixel region is formed on the insulating substrate 210. The black matrix 220 is made of an opaque metal such as chrome (Cr) or an opaque organic material with carbon black added thereto. For example, the black matrix 220 may have a stacked structure of a first chrome film and a second organic film, or may have a stacked structure of color filters having different colors. The black matrix 220 has a width large enough to cover gate lines, data lines, and thin film transistor regions of the first display panel. In a case where the opaque metal such as chrome (Cr) is used as the black matrix 220, chrome (Cr) is deposited on the insulating substrate 210, followed by patterning by photolithography. In a case where the organic material (such as a photosensitive organic mixture) is used as the black matrix 220, the organic mixture is coated, exposed and developed, to be patterned.

The color filter patterns 230 of red (R), green (G), and blue (B) color filters are alternately arranged on the black matrix 220. Each of the color filter patterns 230 fills a pixel region surrounded by the black matrix 220.

An organic material may be used as the color filter pattern 230. In this case, a photosensitive organic mixture may be used for patterning through exposure and development. For example, in a case where three color filters of red, green and blue colors are used as the color filter pattern 230, the patterning is performed three times. According to another exemplary embodiment, the patterning of the color filter pattern 230 may be performed by intaglio printing or inkjet printing.

The color filter pattern 230 and the black matrix pattern 220 may partially overlap each other, e.g., lateral ends of the color filter pattern 230 and the black matrix pattern 220 may be in direct contact with each other in an overlapping relationship. An over-coat film 240 may be formed on, e.g., the entire surface, of the insulating substrate 210 to planarize a step difference formed between the color filter pattern 230 and the black matrix pattern 220. An organic material, such as a thermally curable acryl resin, a polyimide resin or an epoxy resin may be used as the over-coat film 240 and may be coated by, for example, spin coating.

An alignment film (not shown) may further be formed on each of the first and second display panels 100 and 200. In absence of a voltage applied to the liquid crystal display (500 of FIG. 1), each alignment film may restrict alignment of the liquid crystals 310. Each alignment film (not shown) may be an alignment film including an organic material (to be referred to as "organic alignment film"), or an alignment film including an inorganic material (to be referred to as "inorganic alignment film").

The organic alignment film includes an organic material, such as a polyimide resin. The organic alignment film is formed on the common electrodes 121, 122 and 123 of the first display panel and the over-coat layer 240 of the second display panel by, for example, spin coating or bar coating. The organic alignment film may adjust an alignment direction of liquid crystals by rubbing its surface, for example.

In addition, the inorganic alignment film may include, for example, a metal oxide such as magnesium oxide (MgO) or indium tin oxide (ITO), and/or a silicon oxide ($SiO_x$) such as $SiO_2$ or SiO. Since the inorganic alignment film is better than the organic alignment film in view of chemical stability and light stability, the reliability of a liquid crystal display including the inorganic alignment film can be improved. The inorganic alignment film is formed on the first display panel 100 and the second display panel 200 by, for example, CVD, PECVD or sputtering. The inorganic alignment film may adjust alignment of liquid crystals by subjecting its surface to ion beam or laser treatment. In a case of performing surface treatment using ion beams, static electricity is not generated in the inorganic alignment film, unlike in the organic alignment film.

The first display panel 100 faces the second display panel 200 with the liquid crystals 310 interposed between the first display panel 100 and the second display panel 200, thereby constituting the liquid crystal display panel.

Figure 4:
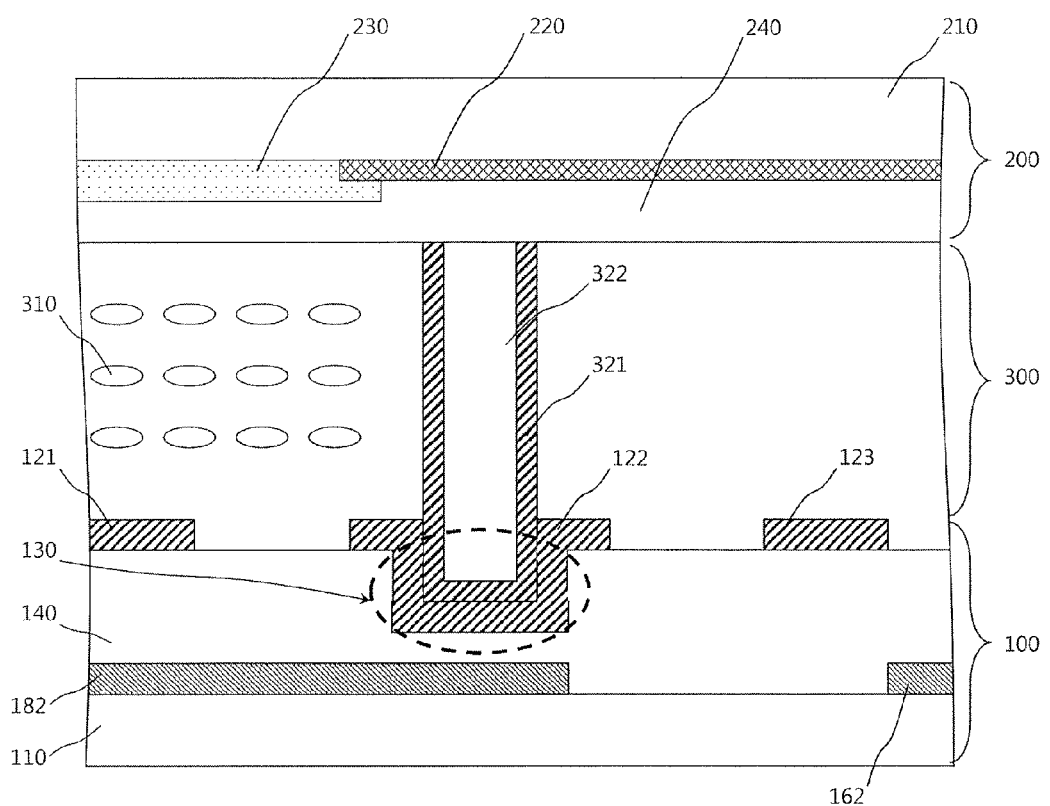

Referring to FIG. 4, a basic configuration of the liquid crystal display may be substantially the same as that of the liquid crystal display shown in FIG. 3. When the first display panel 100 faces the second display panel 200 with the liquid crystals 310 interposed between the first display panel 100 and the second display panel 200 to constitute a liquid crystal display panel, a spacing between the first and second display panels 100 and 200, that is, a cell gap, can be constantly maintained by a cell gap maintaining member 322.

The cell gap maintaining member 322 is formed on the trench 130 while making contact with the over-coat layer 240. In addition, the cell gap maintaining member 322 includes a conductive portion 321, whose surface is coated with the same material as the common electrodes 121, 122 and 123. In a case where the cell gap maintaining member 322 is entirely made of a conductive material, the conductive portion may not be separately provided.

The cell gap maintaining member 322 maintains a cell gap at a constant distance and collects impurity ions floating in the liquid crystals 310. That is to say, the impurity ions included in the liquid crystals 310 for reducing a voltage holding ratio (VHR) of the liquid crystal display (500 of FIG. 1) and generating residual DC are collected by the conductive portion 321 of the cell gap maintaining member 322, thereby increasing the VHR of the liquid crystal display (500 of FIG. 1) and removing the residual DC, ultimately improving display quality of the liquid crystal display (500 of FIG. 1).

In addition, the cell gap maintaining member 322 may adopt a material having ion absorbing capability in itself. The cell gap maintaining member 322 may be, for example, bead-type ion-absorbing spacer.

The bead-type ion-absorbing spacer 322 may be made of, for example, a material capable of absorbing impurity ions floating in the liquid crystals 310, but not limited thereto. The bead-type ion-absorbing spacer 322 may include, for example, a plastic porous body including a polyimide resin having ion absorbing capability, polystyrene, polyethylene, polypropylene, polyester, polyacryl, nylon, or silicon resin, a non-porous body or a hollow body. The bead-type ion-absorbing spacer 322 may further include an acryl resin or an epoxy resin, but embodiments are not limited thereto. For example, various kinds of common resins and additives may further be included in the bead-type ion-absorbing spacer 322.

The bead-type ion-absorbing spacer 322 is disposed in the light-shielding region between the first display panel 100 and the second display panel 200. Light leakage due to the presence of the cell gap maintaining member 322 may be prevented by forming the bead-type ion-absorbing spacer 322 in the light-shielding region, and ion impurities in the light-transmitting region can be collected in the light-shielding region.

FIGS. 5 to 8 illustrate various types of the common electrode 122 formed on the trench 130.

Figure 5:
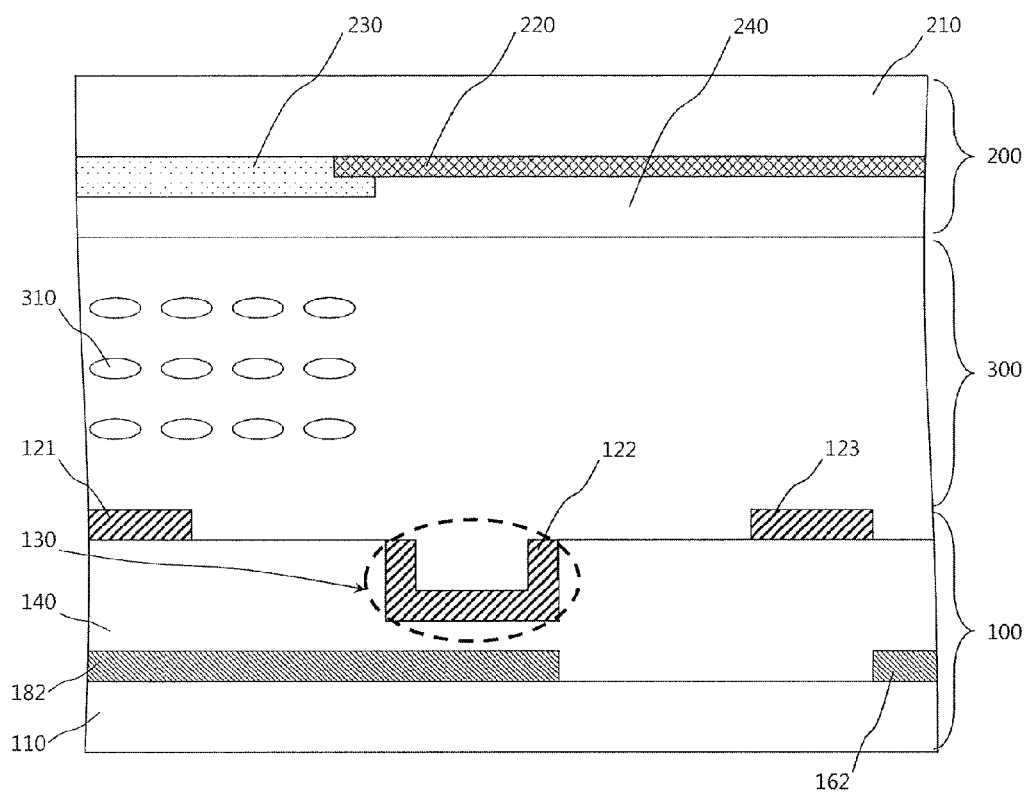

Referring to FIGS. 5 to 8, various exemplary embodiments are illustrated. The common electrode 122 may be formed in the trench 130 and may be formed to cover the entire bottom surface and opposite walls of the trench 130 without covering an upper surface of the passivation film 140, as illustrated in FIG. 5. It will be understand that when rotated, the bottom surface of the trench 130 corresponds to a top surface of the trench 130. In such an interpretation, the top surface of the trench 130 faces a bottom surface of the pixel electrode 182.

Figure 6:
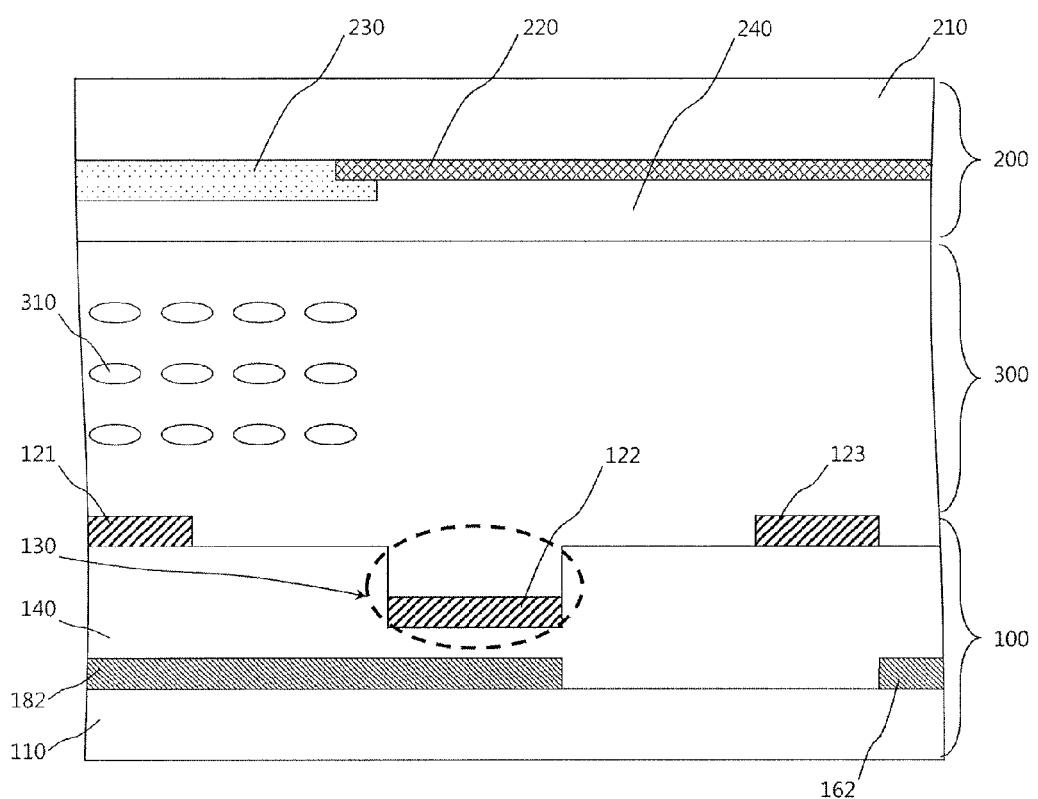

According to another exemplary embodiment, the common electrode 122 may be formed only on the entire bottom surface of the trench 130 without cover an entirety of the opposite walls of the trench 130, as illustrated in FIG. 6. According to another exemplary embodiment, the common electrode 122 may be formed only along a partial portion of the bottom surface of the trench 130 such that a portion of the bottom surface of the trench 130 is exposed and the opposite walls of the trench 130 are not covered by the common electrode 122, as illustrated in FIG. 7.

Figure 7:
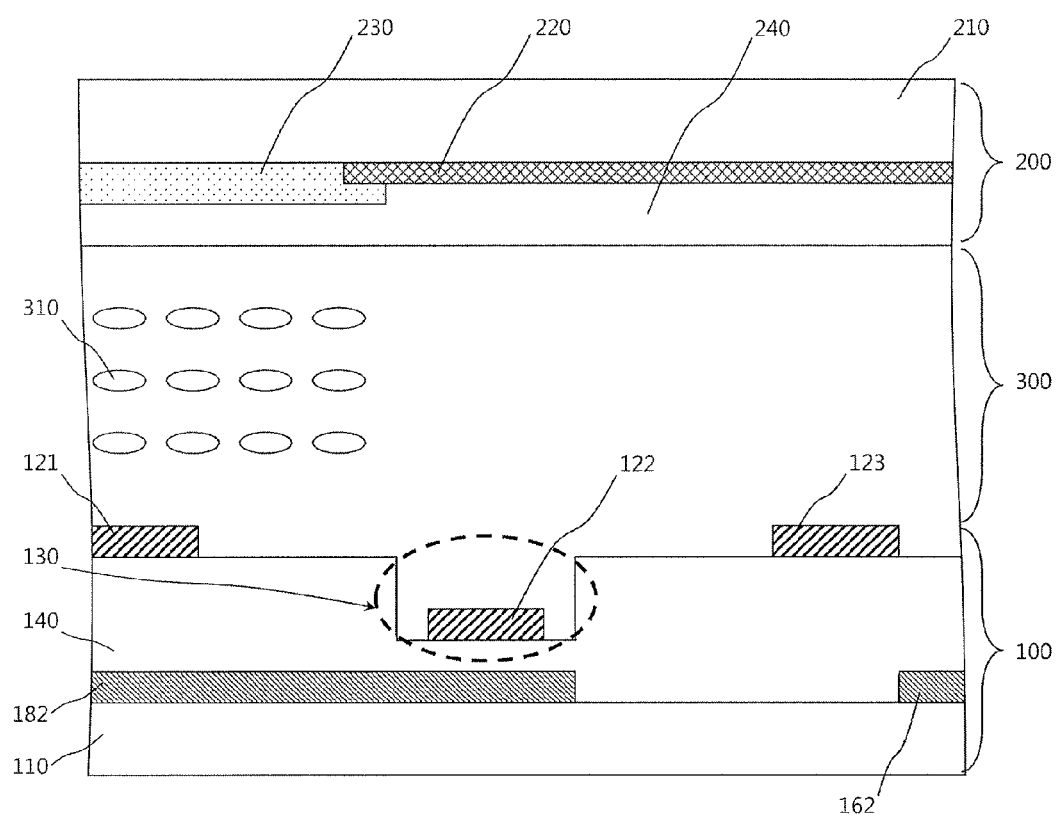
Figure 8:
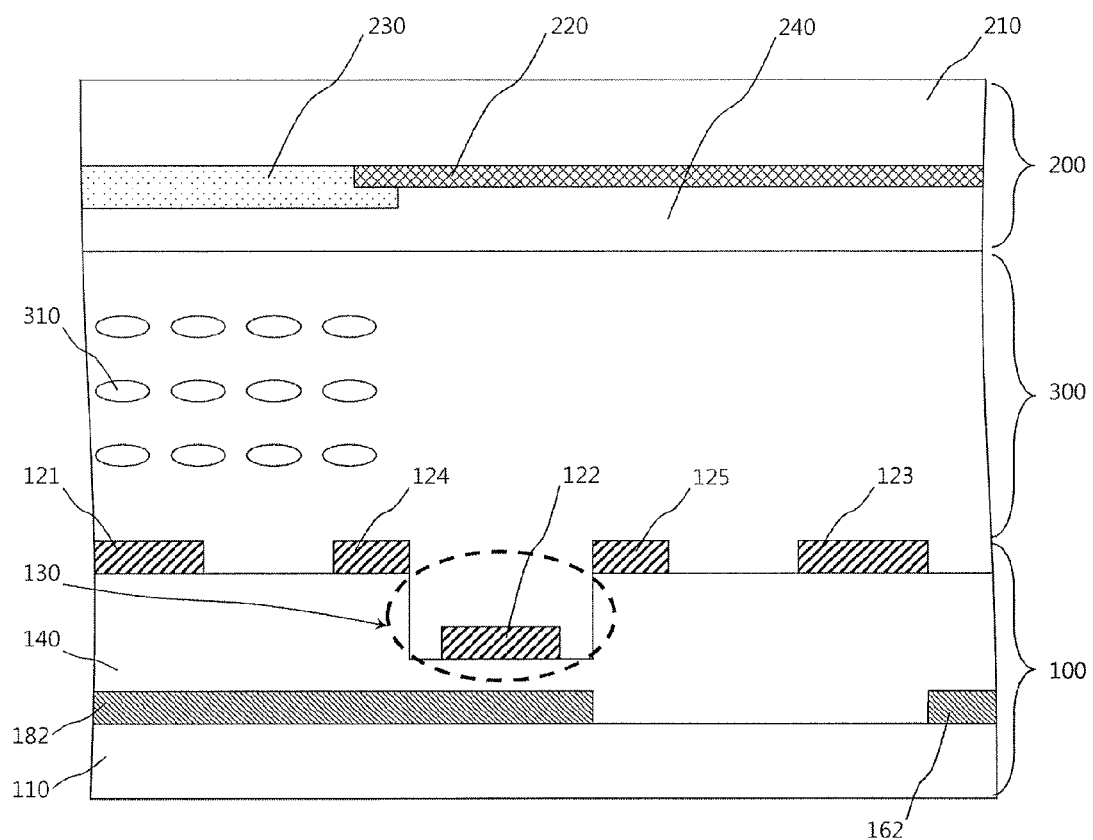

According to another exemplary embodiment, the common electrode 122 may be formed on the bottom surface of the trench 130 (for example, as illustrated in FIG. 6 or 7). Further, conductive portions 124 and 125, which may be referred to as common electrodes 124 and 125, may also be formed on the upper surface of the passivation film 140 adjacent to the trench 130 in the form of separated discrete portions, as illustrated in FIG. 8.

Figure 9:
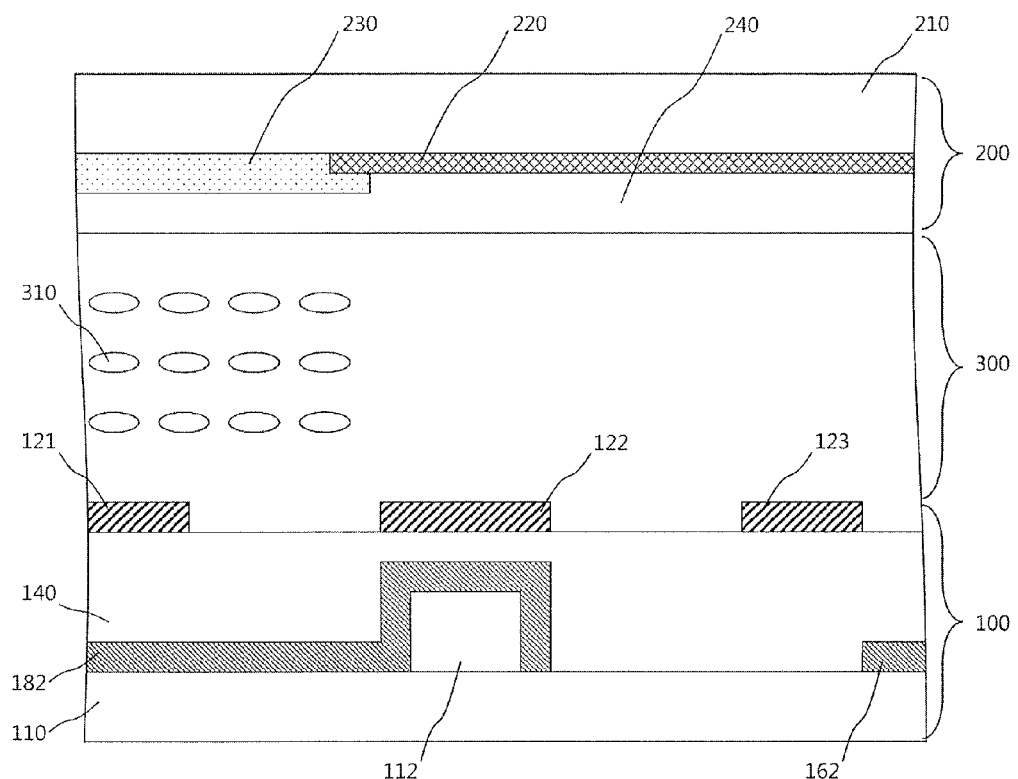

FIG. 9 is a cross-sectional view of a liquid crystal display according to another embodiment. Since a basic configuration of the liquid crystal display may be substantially the same as that of the liquid crystal display shown in FIGS. 3 to 8, repeated explanations thereof will be omitted.

The first display panel 100 has a pattern layer 112 formed on a TFT substrate 110 and a pixel electrode 182 formed on the TFT substrate 110 and the pattern layer 112. Although a separate trench is not provided, the pattern layer 112 makes a vertical spacing between the pixel electrode 182 and the common electrode 122 disposed on the pattern layer 112 shorter than a vertical spacing between a common electrode 121 and the pixel electrode 182 in the light-transmitting region. For example, the portion of the pixel electrode 182 that overlaps the common electrode 122 may be a protrusion portion, for example, within a trench in the passivation film 140. The protrusion portion of the pixel electrode 182 extends further away from the TFT substrate 110 than another portion of the pixel electrode 182 that overlaps the common electrode 121. The common electrode 122 may be on the trench that houses the protrusion portion of the pixel electrode 182 therein.

Accordingly, a strong electric field is formed, so that impurity ions floating in liquid crystals 310 are collected by the common electrode 122. That is to say, the impurity ions included in the liquid crystal layer 300 for reducing a voltage holding ratio (VHR) of the liquid crystal display (500 of FIG. 1) and generating residual DC are collected by the common electrode 122, thereby increasing the VHR of the liquid crystal display (500 of FIG. 1) and removing the residual DC, ultimately improving display quality of the liquid crystal display (500 of FIG. 1).

The pattern layer 112 may also be formed at the same time when forming the TFT substrate 110 or may be formed through a separate forming step after forming the TFT substrate 110.

The above-described embodiments are provided only for illustration and combinations of different embodiments may also be adopted.

By way of summation and review, a liquid crystal display may include a first display panel and a second display panel that face each other. The first display panel and the second display panel may be combined and adhered to each other by a sealing member such as a sealant, and liquid crystals may be inserted into an inner space between the first display panel and the second display panel. Wires and electrodes may be arranged on the first display panel and the second display panel, and an organic film may be provided to insulate and/or protect the wires and electrodes. However, a reduction in the voltage holding ratio (VHR) or residual DC may be generated due to impurity ions floating in the liquid crystals of the display device, resulting in luminance deterioration, and an afterimage may be viewed.

In contrast, embodiments relate to a liquid crystal display that can improve residual DC while increasing a voltage holding ratio in an image display region. Embodiments also relate to a method for fabricating the liquid crystal display.

Embodiments may provide the effect of impurity ions floating in the liquid crystal being collected at a region where a vertical spacing between a common electrode and a pixel electrode is relatively short, thereby increasing the VHR of the liquid crystal display and improving residual DC. Therefore, the liquid crystal display, according to embodiments, has excellent luminance on a display screen without an afterimage effect.

While embodiments have been particularly shown and described with reference to exemplary embodiments thereof, it will be understood by those of ordinary skill in the art that various changes in form and details may be made therein without departing from the spirit and scope of the invention as defined by the following claims. It is therefore desired that the present embodiments be considered in all respects as illustrative and not restrictive, reference being made to the appended claims rather than the foregoing description to indicate the scope of the invention.

Although exemplary embodiments have been described for illustrative purposes, those skilled in the art will appreciate that various modifications, additions and substitutions are possible, without departing from the scope and spirit of the invention as disclosed in the accompanying claims.

What is claimed is:

1. A liquid crystal display, comprising:
a first display panel including a light-transmitting region and a light-shielding region;
a second display panel that faces the first display panel with liquid crystals interposed between the first and second display panels and that includes a TFT substrate, a pixel electrode on the TFT substrate, a passivation film on the TFT substrate and the pixel electrode, and a common electrode patterned on the passivation film; and
a trench in the passivation film within the light-shielding region between the first and second display panels, the trench overlapping the pixel electrode and enclosing the light-transmitting region, the trench being between the light-transmitting region and a data line within the light-shielding region in a direction perpendicular to a direction between the first and second display panels, and the common electrode being on the trench.

2. The liquid crystal display of claim 1, wherein a bottom portion of the trench faces the pixel electrode.

3. The liquid crystal display of claim 2, wherein a portion of the common electrode on a bottom portion of the trench has a shorter vertical spacing from the pixel electrode than another portion of the common electrode on the passivation film.

4. The liquid crystal display of claim 1, wherein the first display panel includes:
a color filter in the light-transmitting region and a black matrix in the light-shielding region, which are positioned on a surface of a first substrate, and
an over-coat layer covering the color filter and the black matrix.

5. A liquid crystal display, comprising:
a first display panel including a light-transmitting region and a light-shielding region;
a second display panel that faces the first display panel with liquid crystals interposed between the first and second display panels and that includes a TFT substrate, a pixel electrode formed on the TFT substrate, a passivation film formed on the TFT substrate and the pixel electrode, and a common electrode patterned on the passivation film;
a trench in the passivation film within the light-shielding region between the first and second display panels, the trench overlapping the pixel electrode and enclosing the light-transmitting region, the trench being between the light-transmitting region and a data line within the light-shielding region in a direction perpendicular to a direction between the first and second display panels, and the common electrode being on the trench; and
a cell gap maintaining member having a cell gap maintaining member that includes a conductive material, that covers at least a portion of the common electrode, that contacts a surface of an over-coat layer, and that is on the trench.

6. The liquid crystal display of claim 5, wherein the cell gap maintaining member includes the conductive material on a surface thereof.

7. The liquid crystal display of claim 6, wherein the conductive material is a same material as the common electrode.

8. The liquid crystal display of claim 7, wherein the conductive material is an indium tin oxide (ITO).

9. The liquid crystal display of claim 5, wherein a bottom portion of the trench is formed at a location corresponding to the pixel electrode.

10. The liquid crystal display of claim 9, wherein a portion of the common electrode on the bottom portion of the trench has a shorter vertical spacing from the pixel electrode than another portion of the common electrode on the passivation film.

* * * * *